United States Patent [19]
Hamanaka et al.

[11] Patent Number: 5,613,767
[45] Date of Patent: Mar. 25, 1997

[54] ILLUMINATING APPARATUS

[75] Inventors: Kenjiro Hamanaka; Takashi Kishimoto; Koichi Nishizawa; Kenichi Nakama, all of Osaka, Japan

[73] Assignee: Nippon Sheet Glass Co., Ltd., Osaka, Japan

[21] Appl. No.: 423,701

[22] Filed: Apr. 18, 1995

Related U.S. Application Data

[62] Division of Ser. No. 39,838, Mar. 30, 1993, Pat. No. 5,432,692.

[30] Foreign Application Priority Data

| Apr. 3, 1992 | [JP] | Japan | 4-81988 |
| Apr. 3, 1992 | [JP] | Japan | 4-82057 |
| Apr. 3, 1992 | [JP] | Japan | 4-82214 |
| Mar. 2, 1993 | [JP] | Japan | 5-40772 |

[51] Int. Cl.$^6$ .................................................. F21V 7/09
[52] U.S. Cl. ................................... 362/298; 362/346
[58] Field of Search .............................. 362/298, 299, 362/346, 350, 297

[56] References Cited

U.S. PATENT DOCUMENTS

| 1,256,522 | 2/1918 | Croxton | 362/299 |
| 2,099,952 | 11/1937 | Brock | 362/299 |
| 3,427,447 | 2/1969 | Clark | 362/299 |
| 4,241,382 | 12/1980 | Daniel | 362/346 |
| 5,217,299 | 6/1993 | Yoshida et al. | 362/298 |
| 5,309,340 | 5/1994 | Shigeta et al. | 362/299 |
| 5,446,639 | 8/1995 | Hamanaka et al. | 362/298 |

*Primary Examiner*—Y. My Quach
*Attorney, Agent, or Firm*—Brumbaugh, Graves Donohue & Raymond

[57] ABSTRACT

The improved illuminating apparatus comprises a spheroidal mirror, a light source, a spherical mirror and a condenser lens. The spheroidal mirror has such a shape that it is deficient of a portion that would otherwise reflect light that illuminates any portions other than the object to be illuminated, and that the light from the light source which is directed toward said missing portion is reflected by the spherical mirror positioned on the rear side of said missing portion as seen from the light source and makes another reflection by that part of the spheroidal mirror which faces away said missing portion, thereby illuminating the object. The light source is positioned at the first focal point of the spheroidal mirror in such a way that it faces the mirror, and the spherical mirror is positioned in such a way that its reflecting face lies at the second focal point of the spheroidal mirror. An open window for the exit of light beams is provided in the spherical mirror at a position near the second focal point of the spheroidal mirror, and the condenser lens is provided further ahead of the open window (closer to the object to be illuminated).

8 Claims, 5 Drawing Sheets

ILLUMINATING APPARATUS

This application is a division of application Ser. No. 08/039,838, filed on Mar. 30, 1993 U.S. Pat. No. 5,432,692.

BACKGROUND OF THE INVENTION

This invention relates to an illuminating apparatus such as a slide projector, a liquid-crystal video projector or an OHP sheet projector that are suitable for illuminating objects, especially those having a rectangular or square shape.

Conventional illuminating apparatus of the type contemplated by the present invention are available as a system in which a light source such as a halogen lamp, a xenon lamp or a metal halide lamp is combined with a parabolic or spheroidal mirror and a condenser lens (see, for example, Chapter 3, Section 1 of "Designing Projection Televisions", Trikeps Publishing Company). However, these conventional systems have had the problem that the light issuing from the light source in directions other than those pointed to the parabolic or spherical mirror is not effectively used for illumination, thereby lowering the efficiency of utilization of the light emitted from the light source. (On the pages that follow, the proportion of emitted light that is reflected by the parabolic or spheroidal mirror and thereafter collected is sometimes referred to as the "efficiency of utilization of emitted light").

An illuminating apparatus intended to solve this problem is described in Japanese Patent Laid-Open Publication (kokai) Hei-3-168629. FIG. 10 is a simplified cross-sectional view showing diagrammatically the composition of that apparatus. As shown, a light source 1 is positioned at the first focal point of a spheroidal mirror 2. A spherical mirror 3 whose radius of curvature is equal to the focal length of the spheroidal mirror 2 is positioned in such a way that the center of curvature coincides with the first focal point of the spheroidal mirror 2. An aperture 31 of a desired size is provided in the central portion of the spherical mirror 3.

A light beam 61 from the light source 1 that has reached the surface of the spherical mirror 3 is reflected, collected at the light source 1 and thereafter reaches the surface of the spheroidal mirror 2. This beam is collected at the second focal point of the spheroidal mirror 2 together with a light beam 62 from the light source 1 that has directly reached the surface of the spheroidal mirror 2.

The light collected at the second focal point of the spheroidal mirror 2 passes through the aperture 31 in the spherical mirror 3 and is incident on a condenser lens 4, from which it emerges as parallel or slightly convergent light rays that illuminate a rectangular object 5.

As is clear from FIG. 10, the radius of curvature of the spherical mirror 3 is equal to the focal length of the spheroidal mirror 2 and the second focal point of the spheroidal mirror 2 lies on the plane of the spherical mirror 3. Because of these features, it has been possible to reduce the size of aperture 31 to a very small scale. Hence, practically all part of the light emitted from the light source 1 can be collected at the second focal point of the spheroidal mirror 2, thereby producing illuminating rays that permit very efficient utilization of emitted light.

Another illuminating apparatus that has been proposed to solve the aforementioned problem of the prior art is described in Japanese patent Laid-Open Publication (kokai) HEI No. 4-063321. FIG. 11 is a simplified cross-sectional view showing diagrammatically the composition of the apparatus. As shown, a light source 1 is positioned at the first focal point of a spheroidal mirror 2 and a spherical mirror 3 is positioned in such a way that its center of curvature coincides with the first focal point of the spheroidal mirror 2. A rectangular aperture 31 of a desired size is provided in the central portion of the spherical mirror 3. The spheroidal mirror 2 is truncated by the lines of intersection created when a quadratic prism having the same cross-sectional shape as the aperture 31 is inserted into that aperture. The peripheral portion of the mirror 2 assumes a rectangular shape when it is seen at infinity on the optical axis 8 passing through the central portion of the exit plane.

A light beam 61 from the light source 1 that has reached the surface of the spherical mirror 3 is reflected, collected at the light source 1 and thereafter reaches the surface of the spheroidal mirror 2. This beam is collected at the second focal point of the spheroidal mirror 2 together with a light beam 62 from the light source 1 that has directly reached the surface of the spheroidal mirror 2.

If the second focal point is far more distant than the rectangular object 5 to be illuminated as in the apparatus shown in FIG. 11, the light collected at the second focal point emerges as slightly convergent rays which are capable of illuminating the rectangular object 5.

The system under consideration produces practically rectangular illuminating rays and, therefore, if the peripheral shapes of the aperture 31 and the spheroidal mirror 2 are set in such a way that a cross section of the illuminating rays reaching the rectangular object 5 has the same dimensions as the object, almost all of the illuminating rays can be used to illuminate the object 5. (On the pages that follow, the proportion of the area of the patterned shape that is illuminated with the illuminating rays and which is occupied by the area of the object being illuminated is referred to as the "efficiency of illumination").

The system described in Japanese Patent Laid-Open Publication (kokai) Hei-3-168629, supra, achieves very efficient utilization of emitted light but, on the other hand, the peripheral shape of the spheroidal mirror 2 is circular and, hence, the pattern of illumination 72 with the illuminating rays 71 that reach the object 5 is circular as shown in FIG. 12. In contrast, the shape of the object 5 is not necessarily circular, so the pattern of illumination 72 with the illuminating rays 71 must be in a circular form of a size that is at least large enough to be circumscribed with the object 5. Under the circumstances, that portion of the light which illuminates outside the object 5 is not effectively used, thus lowering the efficiency of illumination.

The system described in Japanese Patent Laid-Open Publication (kokai) Hei-4-063321, supra, produces the illuminating rays 71 having a rectangular pattern of illumination 72 and the peripheral shapes of the aperture 31 and the spheroidal mirror 2 can be set in such a way that the pattern of illumination 72 with the illuminating beams 71 reaching the rectangular object 5 has the same dimensions as said object. Hence, almost all of the illuminating rays can be effectively used to achieve very efficient illumination.

However, in view of the slightly convergent nature of the illuminating rays 71, the aperture 31 in the spherical mirror 3 must be larger than the object 5. In other words, the size of the aperture 31 increases considerably, and so does the amount of a light beam 64 from the light source 1 that leaks directly through the aperture 31 without contributing to the intended illumination. As a result, the efficiency of utilization of emitted light is lowered.

Under the circumstances, the present inventors thought of altering the peripheral shape of the spheroidal mirror in the system described in Japanese Patent Laid-Open Publication (kokai) Hei-3-168629, and they reviewed the case where the spheroidal mirror 2 was redesigned to have a rectangular periphery (as seen at infinity), which is the shape of the spheroidal mirror used in the system described in Japanese Patent Laid-Open Publication (kokai) Hei-4-063321, supra (see FIG. 11).

This modified system (hereunder sometimes referred to as the "reviewed case") achieved very efficient utilization of emitted light as in the case described in Japanese Patent Laid-Open Publication (kokai) Hei-3-168629. However, as it turned out, the magnification achieved by the spheroidal mirror 2 differed between the area near the optical axis and the peripheral portion and, hence, the pattern of illumination 72 with the illuminating rays 71 as collimated by the condenser lens did not come out in a rectangular shape as in the case of Japanese Patent Laid-Open Publication (kokai) Hei-4-063321 but was distorted in a pincushion form as shown in FIG. 6. This has caused the problem that if the pattern of illumination 72 with the illuminating rays 71 is adjusted to be of a size that is circumscribed with the object 5, the rays of light illuminating outside the object 5 are not effectively used, thus failing to achieve efficient illumination.

SUMMARY OF THE INVENTION

The present invention has been accomplished under these circumstances and has as an object providing an illuminating apparatus that achieves efficient utilization of emitted light and which produces an illumination pattern of comparable size to the object to be illuminated, thereby achieving efficient illumination.

In the first aspect of the present invention, the above-stated object is attained by an illuminating apparatus using illumination optics that comprises a light source that emits light in a wide range of directions subtending a solid angle of approximately $2\pi$ or more from within the range of a spherical zone having a radius of approximately 10 mm or less, a spheroidal mirror positioned at the back of said light source, a spherical mirror positioned in front of the light source and which is provided with an open window through which to pick up illuminating light, and a lens, which components have the following positional relationships and design specifications:

the light source is positioned near the first focal point of the spheroidal mirror and near the center of curvature of the spherical mirror so that the greater part of the rays issuing from the light source will be collected near the second focal point of the spheroidal mirror, and the following conditions are satisfied:

$$2.3 \leq m \leq 5 \text{ and } 0.8 \, Df \leq Rms \leq 1.2 \, Df$$

where Rms is the radius of the spherical mirror; Df is the distance between the first and second focal points of the spheroidal mirror; Ds is the distance between the vertex and the first focal point of the spheroidal mirror; and m is the magnification expressed by $(Ds+Df)/Ds$.

In its second aspect, the above-stated object of the present invention is attained by an illuminating apparatus having illumination optics that comprises a light source that emits light in a wide range of directions subtending a solid angle of approximately $2\pi$ or more from within the range of a spherical zone having a radius of approximately 10 mm or less, a spherical mirror positioned at the back of said light source, a spherical mirror positioned in front of the light source and which is provided with an open window through which to pick up illuminating light, and a lens, which components have the following positional relationships and design specifications:

the light source is positioned near the first focal point of the spheroidal mirror and near the center of curvature of the spherical mirror so that the greater part of the rays issuing from the light source will be collected near the second focal point of the spheroidal mirror, and the following condition is satisfied:

$$0.8 \tan^{-1}(2m/m^2-1) \leq \theta \leq 1.2 \tan^{-1}(2m/m^2-1)$$

where Df is the distance between the first and second focal points of the spheroidal mirror; Ds is the distance between the vertex and the first focal point of the spheroidal mirror, m is the magnification expressed by $(Ds+Df)/Ds$; and $\theta$ is the entrance aperture angle of the lens.

In its third aspect, the above-stated object of the present invention is attained by illuminating apparatus having illumination optics that comprises a light source that emits light in a wide range of directions subtending a solid angle of approximately $2\pi$ or more from within the range of a spherical zone having a radius of approximately 10 mm or less, a spheroidal mirror positioned at the back of said light source, a spherical mirror positioned in front of the light source, and a lens, which components have the following positional relationships and design specifications:

the light source is positioned near the first focal point of the spheroidal mirror and near the center of curvature of the spherical mirror so that the greater part of the rays issuing from the light source will be collected near the second focal point of the spheroidal mirror; the radius of the spherical mirror is adjusted to be substantially equal to the distance between the first and second focal points of the spheroidal mirror; an opening of size W (which is the diameter of a circle or the length of one side of a rectangle) is provided near the center of the spherical mirror; and the following condition is satisfied by W and Fc, or the focal length of the lens:

$$1° \text{ (degree)} \leq \tan^{-1}(W/2Fc) \leq 6° \text{ (degrees)}$$

In its fourth aspect, the above-stated object of the present invention is attained by an illuminating apparatus that comprises:

(A) a spheroidal mirror 2;

(B) a light source 1 positioned at the first focal point 21 of said spheroidal mirror 2;

(C) a spherical mirror 3 whose center of curvature coincides with said first focal point 21, which has an aperture 31 in its central portion and whose radius of curvature is substantially equal to the distance between the first focal point 21 and the second focal point 22 of said spheroidal mirror 2; and (D) a condenser lens 4 with which the light rays 63 from the light source that are reflected by said spheroidal mirror 2 and which diverge after converging at the second focal point 22 of said spheroidal mirror 2 are collimated to produce substantially parallel rays, which will illuminate an object to be illuminated, which apparatus is characterized in that said spheroidal mirror 2 has such a shape that it is deficient of a portion 23 that would otherwise reflect light that illuminates any portions other than the object 5, and that the light from the light source 1 which is directed toward said missing portion 23 is reflected by the spherical mirror 3 positioned on the rear side of said missing portion 23 as seen from said light source 1 and makes another reflection by that part of the spheroidal mirror 2 which faces away said missing portion 23, thereby illuminating the object 5.

In a preferred embodiment of this fourth aspect, the spheroidal mirror 2 forms its peripheral portion by the lines of intersection of the four imaginary planes that are constructed by the following procedure:

(a) assume a plane 41 perpendicular to the optical axis 8 of the illuminating apparatus at the position of the principal plane of the condenser lens 4;

(b) project the object 5 with a rectangular shape onto the plane 41 with parallel rays of light and assume the resulting orthographic projection 51;

(c) assume a quadrilateral pyramid that has the orthographic projection 51 as its base and whose vertex facing said base is positioned at the second focal point 22 of the spheroidal mirror 2; and (d) extend the four lateral sides of said quadrilateral pyramid to construct four imaginary planes.

DETAILED DESCRIPTION OF THE PREFERRED EMBODIMENT

The basic composition of the illuminating apparatus of the present invention is described in Japanese patent Laid-Open Publication (kokai) Hei-3-168629. The characterizing part of the present invention is the spheroidal mirror which is discussed below in detail with reference to FIGS. 7 to 9, in which the mirror is indicated by 2.

Figure 7:
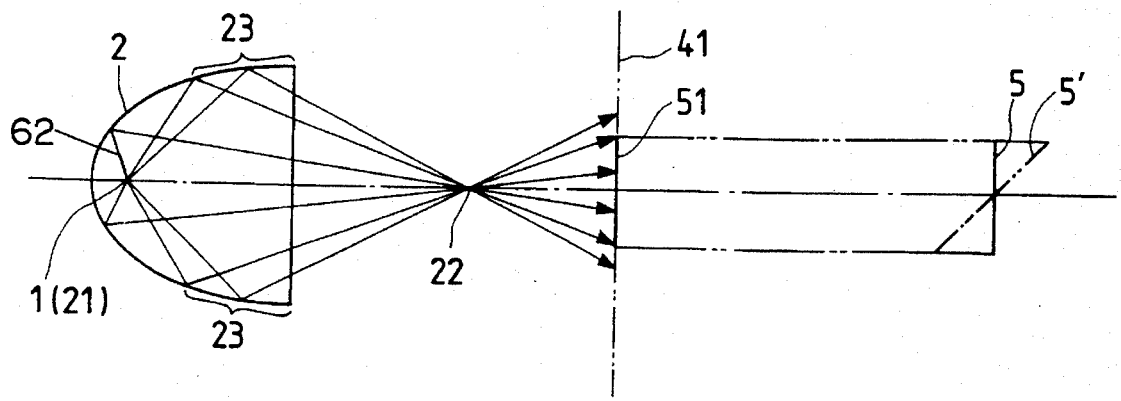
FIG. 7 is a diagram illustrating the method of determining the peripheral shape of the spheroidal mirror used in the system of the present invention.

First, referring to FIG. 7, a light beam 62 from the light source 1 that has directly reached the surface of the spheroidal mirror 2 is collected at the second focal point of the spheroidal mirror 2. The light rays collected at the second focal point 22 will thereafter diverge.

Assume here that the orthographic projection 51 of the object to be illuminated lies in the plane 41 (for it definition, see above). Then, a light beam from the light source 1 that is reflected by that portion of the spheroidal mirror 2 which is indicated by 23 will illuminate any other portions of the object than its orthographic projection 51.

Therefore, even if the condenser lens 4 is provided at the position of the plane 41 so that the divergent rays 63 will be collimated to produce substantially parallel rays, the light reflected by the portion 23 of the spheroidal mirror 2 will not illuminate the object 5. This has been the primary reason for the low efficiency of illumination by the illuminating apparatus proposed in Japanese Patent Laid-Open Publication (kokai) Hei-3-168629.

Under the circumstances, the present inventors eliminated the portion 23 of spheroidal mirror 22 and designed a system in which the light that would otherwise be reflected by the eliminated portion was reflected by the spherical mirror 3 located on the rear side of said portion 23 and made another reflection by that part of the spheroidal mirror 2 which faced said eliminated portion, whereby the thus reflected light would eventually illuminate the object 5. In this way, one can construct an illuminating apparatus that allows efficient utilization of light emitted from the light source 1 and which yet achieves efficient illumination.

The peripheral portion of the spheroidal mirror 2 has such a shape that it is defined by the contour line produced when the object 5 is projected in point symmetry with the origin located at the second focal point 22 of the spheroidal mirror 2. In other words, the shape of the periphery of the spheroidal mirror 2 may be regarded as being equivalent to the object 5 with the origin located at the second focal point 22 of the spheroidal mirror 2.

If the peripheral portion of the spheroidal mirror 2 is set to have the shape described above, a cross-sectional shape of the collected rays 63 can be made geometrically similar to the object 5.

The foregoing description assumes that the object 5 is disposed normal to the optical axis 8 but this is not the sole case of the present invention and the object to be illuminated may be inclined with respect to the optical axis. An example of this case is shown in FIG. 7, in which the inclined object 5' is delineated by a one-long-and-two-short dashed line. Even in this case, the concept discussed above will apply and one can produce light rays 63 having a cross-sectional shape geometrically similar to that of the orthographic projection 51 that is produced by projecting the object 5' onto the plane 41 with parallel rays.

In the next place, we will describe the sizes of the spheroidal mirror 2 and the spherical mirror 3, as well as their relative positions. The spheroidal mirror 2 is of such a shape that it is deficient of the portion 23 which would otherwise reflect the light that illuminates any other portions than the object 5 to be illuminated. The efficiency of utilization of emitted light would drop if there were no reflecting faces of the spherical mirror 3 behind the eliminated portion 23 as seen from the light source 1. Therefore, in order to insure that the reflecting face of the spherical mirror 3 will be positioned behind the eliminated portion 23 as seen from the light source, such eliminated portion of the spheroidal mirror 2 must be such that it can be inserted inward of the opening 32 in the spherical mirror 3.

To this end, the magnification as achievable by the spheroidal mirror 2 must be selected at an appropriate value. If a magnification of 2.41 is selected, the opening in the spheroidal mirror that has no part missing will contact the opening in the spherical mirror. Therefore, the magnification as achievable by the spheroidal mirror 2 must at least be selected at a value that is greater than 2.41 and which permits the eliminated portion of the spheroidal mirror 2 to be capable of insertion inward of the opening 32 in the spherical mirror 3.

If the above conditions are satisfied, all of the light emitted from the light source 1, except the beams directly issuing through the aperture 31 in the spherical mirror 3, is reflected by the spherical mirror 3 or the spheroidal mirror 2 so that it can be totally collected at the second focal point of the spheroidal mirror 2.

We then discuss the condenser lens. Light rays 63 that are collected at the second focal point 22 of the spheroidal mirror 2 will then diverge and propagate on the lateral sides and within the interior of a pyramid whose vertex is positioned at the second focal point 22 and which has a base that is geometrically similar to the object to be illuminated.

In accordance with the present invention, the principal plane of the condenser lens 4 is disposed in such a position that a cross section of the divergent rays 63 will have substantially the same dimensions as the object to be illuminated. At the same time, the condenser lens 4 is designed in such a way that the front focal plane will generally coincide with the second focal point of the spheroidal mirror 2. If these conditions are met, light will emerge from the condenser lens 4 as illuminating rays that are substantially parallel to each other and which are of substantially the same dimensions as the object to be illuminated.

The NA (numerical aperture) of condenser lens 4 is either comparable to or slightly greater than that of a light beam issuing from the spheroidal mirror 2 and its diameter is either comparable to or slightly greater than the size of the rectangular object 5 to be illuminated.

In some cases, the illuminating rays 71 are desirably somewhat convergent rather than being completely parallel to each other. Take, for example, the case of constructing a Köhler illuminating apparatus; the principal plane of condenser lens 4 may be disposed in such a position that a cross section of the divergent rays 63 will have slightly larger dimensions than the object to be illuminated and, at the same time, the condenser lens 4 is designed in such a way that the front focal plane is somewhat closer to the condenser lens than the second focal point of the spheroidal mirror 2.

The illuminating apparatus of the present invention uses optics in which the light source 1 positioned at the first focal point of the spheroidal mirror 2 is imaged at the second focal point of the spheroidal mirror 2 as enlarged at the magnification achieved by the spheroidal mirror 2. Therefore, in order to insure that almost all of the light rays collected at the second focal point of the spheroidal mirror 2 will go outside through the aperture 31 in the spherical mirror 3, the size of the aperture 31 is desirably equal to the size of the light source 1 as multiplied by the magnification of the spheroidal mirror times a factor of 1.1 to 2.0.

Needless to say, the components or parts that are in principle to be positioned at the first and second focal points of the spheroidal mirror 2, such as the light source 1, the center of curvature of the spherical mirror 3 and the vertex of the imaginary quadrilateral pyramid, need not be positioned exactly at those focal point but may be positioned in the neighborhood of those focal points and, even in that case, the performance of the illuminating apparatus will remain almost the same.

The illuminating optics of the present invention comprises not only a light source and a spheroidal mirror but also a spherical mirror that is positioned in front of those components and whose center of curvature coincides with the position of the light source. Because of this arrangement, light beams issuing in direction outside the spheroidal mirror will be reflected by the spherical mirror to go back to the position of the light source, through which they pass unimpeded; thereafter, those light beams will be reflected by the spheroidal mirror.

Thus, the light beams that issued initially in directions outside the spheroidal mirror are first reflected by the spherical mirror and, thereafter, they travel in the same optical path as the light that issued initially in directions toward the spheroidal mirror, whereby all of these light beams can be picked up through the open window made in a selected area of the spherical mirror; by disposing the lens (condenser lens) in that position of the window, collimated illuminating light or slightly convergent illuminating light which are suitable for use with a slide projector, a liquid-crystal video projector or an OHP sheet projector can be produced, achieving very efficient utilization of illuminating light.

Further, in accordance with the present invention, the following two conditions should be satisfied:

$$2.3 \leq m \leq 5 \text{ and } 0.8 \ Df \leq Rms \leq 1.2 \ Df$$

where Rms is the radius of the spherical mirror; Df is the distance between the first and second focal points of the spheroidal mirror; Ds is the distance between the vertex and the first focal point of the spheroidal mirror; and m is the magnification as defined by $(Ds+Df)/Ds$. If these conditions are met, illuminating optics can be realized that produces highly collimated light and which assures very efficient utilization of illuminating light.

Figure 10:
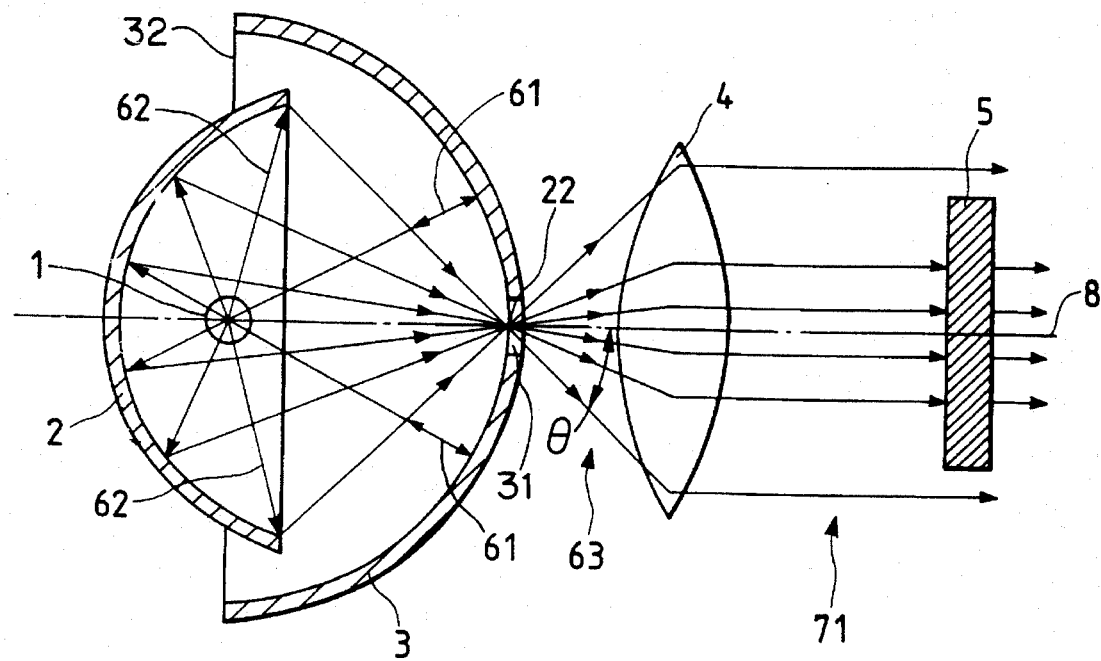
FIG. 10 is a diagram showing schematically the composition of a prior art illuminating apparatus.
Figure 11:
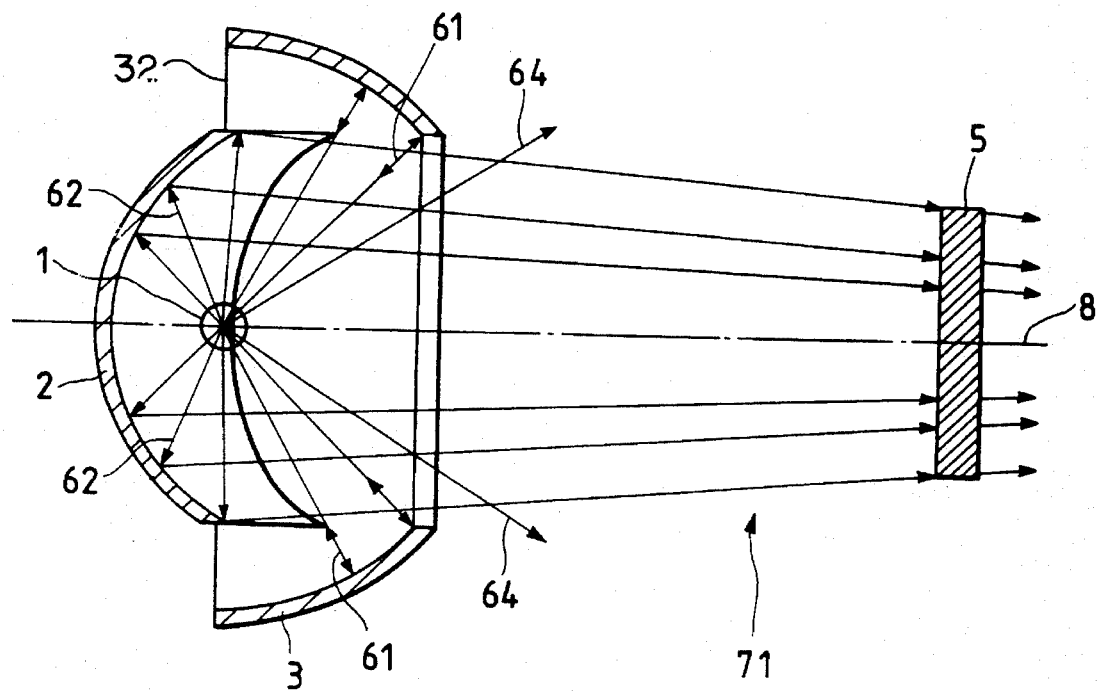
FIG. 11 is a diagram showing schematically the composition of another prior art illuminating apparatus.

In another aspect of the present invention, θ, or the entrance aperture angle of the lens as shown in FIG. 10, is set at a value near $\tan^{-1}(2 \ m/m^2-1)$, where $m=(Ds+Df)/Ds$ where Df is the distance between the two focal points of the spheroidal mirror and Ds is the distance between the vertex and the first focal point of the spheroidal mirror (the light source is positioned near said first focal point). If this condition is met, almost all beams issuing through the open window can be utilized by the lens, contributing to a further increase in the efficiency of utilization of illuminating light.

In yet another aspect of the present invention, the size W of the opening in the spherical mirror and the focal length Fc of the condenser lens are adjusted to satisfy the following relationship:

$$1° \text{ (degree)} \leq \tan^{-1}(W/2Fc) \leq 6° \text{ (degrees)}$$

If this condition is met, one can produce illuminating light of high intensity that permits efficient utilization and which is highly collimated.

Figure 4:
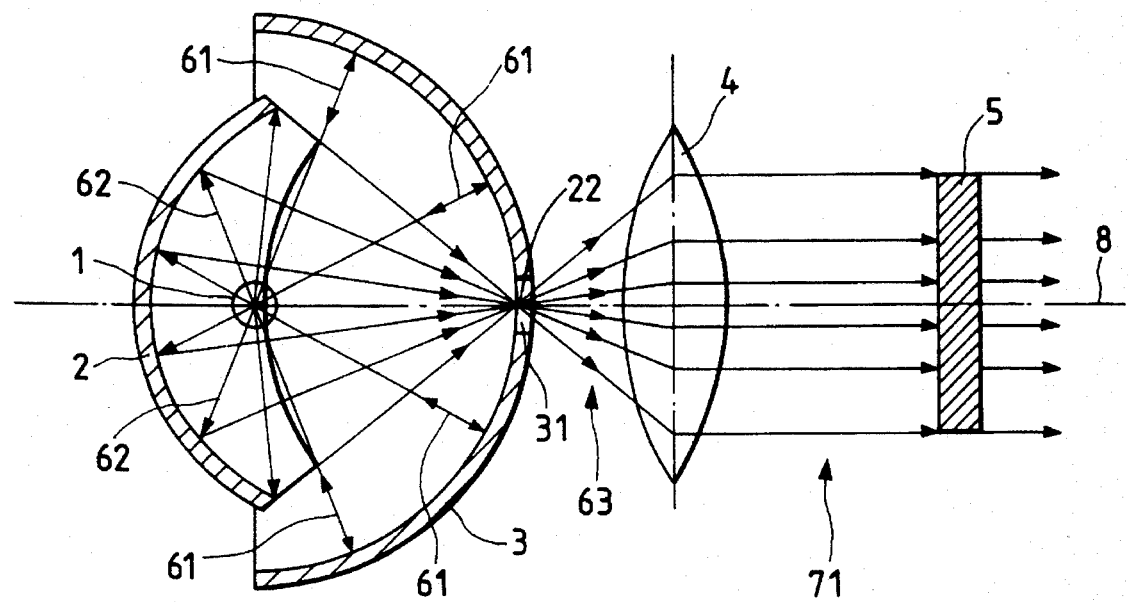
FIG. 4 is a diagram showing an example of the composition of an illuminating apparatus according to the present invention.
Figure 5:
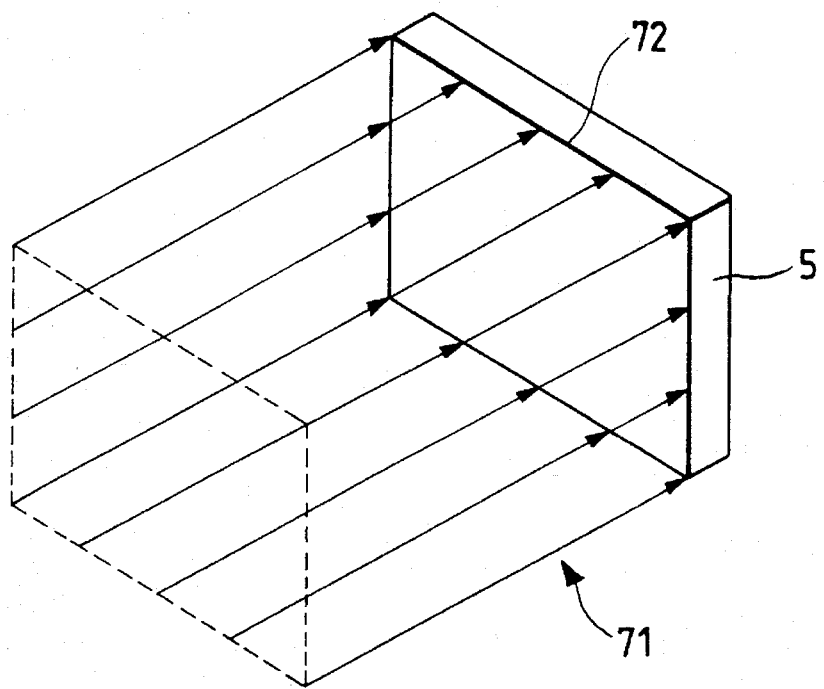
FIG. 5 is a perspective view illustrating the relationship between a rectangular object to be illuminated and the pattern of illumination with illuminating rays according to the present invention.

Further, referring to FIG. 4, a light beam 61 from the light source 1 that has reached the surface of the spherical mirror 3 is reflected, collected at the light source 1 and thereafter reaches the surface of the spheroidal mirror 2. This beam is collected at the second focal point 22 of the spheroidal mirror 2 together with a light beam 62 from the light source 1 that has directly reached the surface of the spheroidal mirror 2.

Since the second focal point 22 of the spheroidal mirror 2 lies on the surface of the spherical mirror 3, the aperture 31 can be rendered very small. Hence, practically all of the light emitted from the light source 1 can be collected at the second focal point 22 of the spheroidal mirror 2.

The peripheral portion of the spheroidal mirror 2 has such a shape that it is defined by the contour line produced when the object 5 to be illuminated is projected in point symmetry with the origin located at the second focal point 22 of the spheroidal mirror 2 and, hence, a cross-sectional shape of the collected rays 63 can be made geometrically similar to the object 5.

If these rays 63 are collimated to form substantially parallel beams of substantially the same size as the object 5, one can produce illuminating beams 71 which are substantially of the same size as the object 5 to be illuminated.

The following examples are provided for the purpose of further illustrating the present invention but are in no way to be taken as limiting.

EXAMPLE 1

Figure 1:
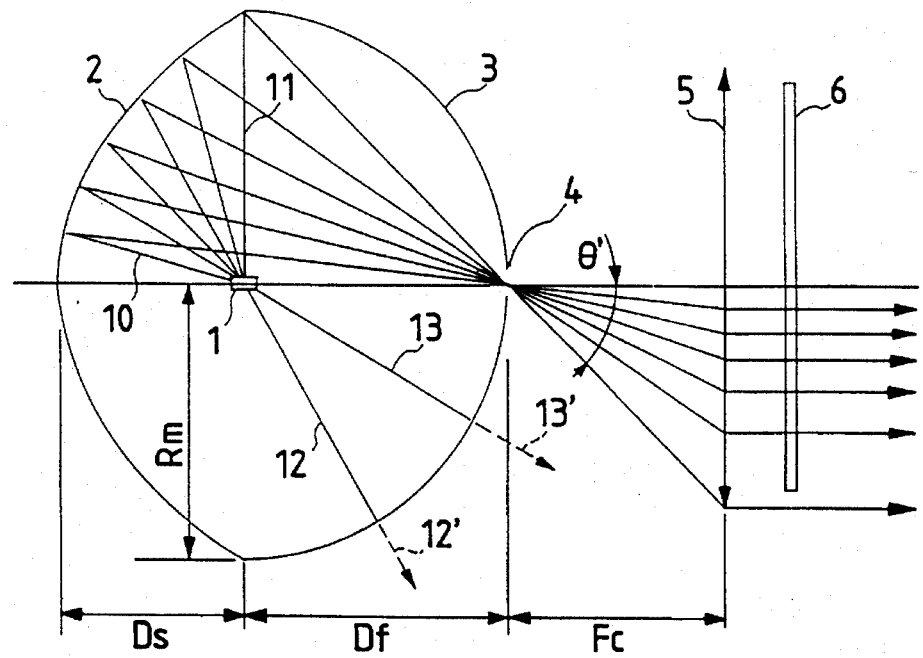
FIG. 1 is a sectional view showing a first embodiment of the present invention.

FIG. 1 shows an illuminating apparatus according to the first embodiment of the present invention. Shown by 1 is a light source such as a halogen lamp, a xenon lamp or a metal halide lamp, with the light emitting portion being included within a spherical zone ranging from several to ten-odd millimeters in diameter.

The light source 1 is positioned at the first focal point 21 of a spheroidal mirror 2. Beams 10 and 11 issuing from the light source 1 backward (the direction in which illuminating light travels eventually is hereunder referred to as "forward" and the opposite direction "backward") and laterally, respectively, are reflected by the spheroidal mirror 2 and thereafter travel toward the second focal point 22 of the spheroidal mirror 2.

A spherical mirror 3 is disposed in such a way that it surrounds the front of the light source 1. This spherical mirror 3 is positioned in such a way that its center of curvature coincides with the light source 1. Hence, beams 12 and 13 issuing from the light source 1 forward are first reflected by the spherical mirror 3, then go back toward the light source 1 and pass through its position; thereafter, those beams travel as if they were emitted from the light source 1 backward and are reflected by the spheroidal mirror 2 to be directed toward its second focal point 22.

The spherical surface of the mirror 3 is positioned in such a way that the second focal point 22 of the spheroidal mirror 2 will lie just on that spherical surface.

An open window 4 is provided in the surface of the spherical mirror 3 at a position near the second focal point 22 of the spheroidal mirror 2. The window should be large enough to permit the passage of most of the beams travelling toward the second focal point 22. Generally speaking, the open window is as large as the effective size of either the light source 1 or the image the light source 1 forms near the second focal point 22 of the spheroidal mirror 2.

In the apparatus described above, all of the beams issuing from the light source 1, namely, a group of beams 10, 11, . . . that are emitted backward and which are reflected by the spheroidal mirror 2 and a group of beams 12, 13, . . . that are emitted forward and which are reflected first by the spherical mirror 3 and then by the spheroidal mirror 2, will emerge through the open window 4 positioned at the second focal point 22 of the spheroidal mirror 2.

Therefore, in the apparatus under consideration which uses the combination of the light source 1, the spheroidal mirror 2 and the spherical mirror 3, the open window 4 works as if it were the secondary light source and the lens 5 which is located in front of the window helps produce collimated or slightly convergent illuminating light having high directivity.

Shown by 6 in FIG. 1 is a slide onto which projection is to be made.

Let us write Rms for the radius of spherical mirror 3, Rm for the radius of spheroidal mirror 2, Df for the distance between the first and second focal points of spheroidal mirror 2, Ds for the distance between the vertex and the first focal point of spheroidal mirror 2, and m for the magnification [m=(Ds+Df)/Ds]. The light source 1, the spheroidal mirror 2 and the spherical mirror 3 are disposed in such a way that light issuing from the light source 1 backward in directions through a solid angle of approximately $2\pi$ will reach the spheroidal mirror 2 whereas light issuing from the light source 1 forward in directions through a solid angle of approximately $2\pi$ will reach the spherical mirror 3.

In order to enhance the efficiency of utilization of illuminating light, the open window 4 must be made in the spherical mirror 3 at a position where the cross-sectional area of the illuminating flux is reduced to the smallest value and in such a way that the window will have a minimum aperture area. Since the flux of light emitted from the light source 1 has its cross-sectional area reduced most at the second focal point of the spheroidal mirror 2, one can see that it is effective to make Rms approximately equal to Df. In practice, consideration of aberrations and other effects make it necessary to allow a certain tolerance for the values that can be taken and an optimum condition for Rms is expressed as follows:

$$0.8\ Df \leq Rms \leq 1.2\ Df \qquad (1)$$

By a simple calculation, Rm or the radius of the spheroidal mirror 2 is expressed as:

$$Rm = 2m \cdot Df/(m^2 - 1) \qquad (2)$$

If Df=Rms, eq. (2) can be rewritten as:

$$Rm = 2m \cdot Rms/(m^2 - 1) \qquad (3)$$

As one can see from FIG. 1, some portion of the light reflected from the spheroidal mirror 2 will go outside the spherical mirror 3 unless Rms≧Rm. The conditions for avoiding this problems is:

$$Rm/Rms = 2m/(m^2 - 1) \leq 1 \qquad (4)$$

Hence, one can derive:

$$m \geq 1 + \sqrt{2} = 2.414 \qquad (5)$$

If Rms in eq. (1) is equal to 1.2 Df, $$m \geq 2.3 \qquad (6)$$

which gives the lower limit of magnification m.

If m increases, the size of the image formed at the second focal point of the spheroidal mirror also increases. Hence, there will be no effective passage of light through the open window 4 unless it is sufficiently large. On the other hand, increasing the size of open window 4 means lower efficiency of utilization of the light that is emitted from the light source 1 forward. Considering these facts, one can see that increasing the value of m too much is not advisable. Thus, the most efficient utilization of light can be achieved if the value of magnification m satisfies the following condition:

$$2.3 \leq m \leq 5 \tag{7}$$

Illuminating optics was constructed using the following numerical data as a typical example (see FIG. 1): Ds=35.4 mm; Df=50 mm; Rm=50 mm; and m=2.414. The optics could achieve very efficient utilization of light.

The slide indicated by 6 in FIG. 1 is replaced by a liquid-crystal panel if the illuminating optics is to be used in a liquid-crystal projector. For use in practical applications, holes for air passage may be provided in the space between the spheroidal mirror 2 and the spherical mirror 3 and the illuminating apparatus under consideration may be air cooled with a fan so as to prevent the elevation in temperature.

EXAMPLE 2

Figure 2:
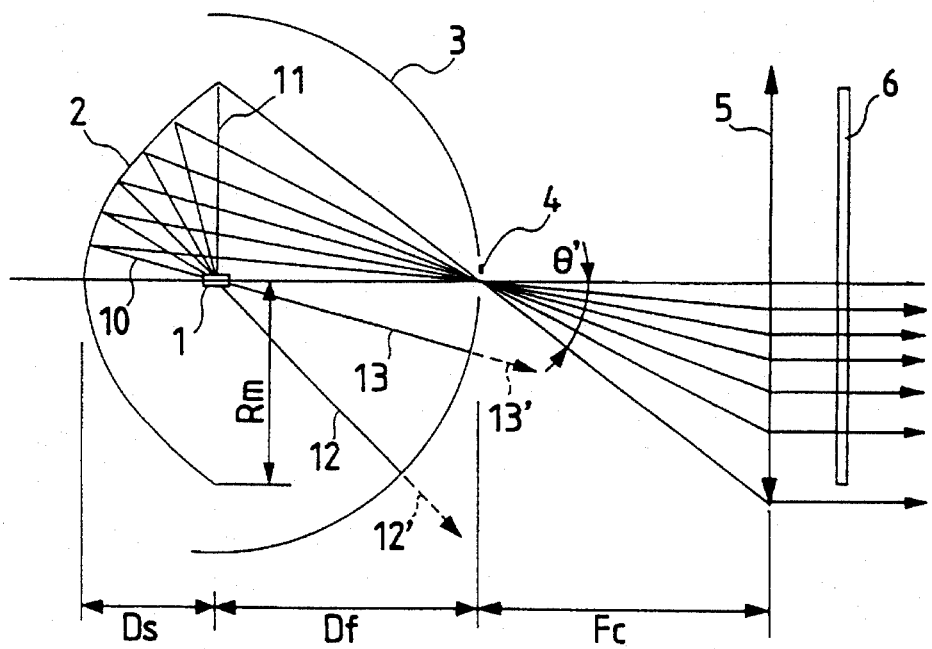
FIG. 2 is a sectional view showing a second embodiment of the present invention.

FIG. 2 shows an illuminating apparatus according to the second embodiment of the present invention. The basic composition of the apparatus is the same as that of the first embodiment and need not be described in detail.

Let us write Df for the distance between the two focal points 21 and 22 of the spheroidal mirror 2, Ds for the distance between the vertex and the first focal point 21 of the spheroidal mirror 2, and m for the magnification [m=(Ds+Df)/Ds]. The light source 1, the spheroidal mirror 2 and the spherical mirror 3 are disposed in such a way that light issuing from the light source 1 backward in directions through a solid angle of approximately 2π will reach the spheroidal mirror 2 whereas light issuing from the light source 1 forward in directions through a solid angle of approximately 2π will reach the spherical mirror 3. By a simple calculation, a maximum radiant angle θ' of the light issuing from the second focal point 22 can be expressed as:

$$\theta' = \tan^{-1}(2m/m^2 - 1) \tag{8}$$

Therefore, if the entrance aperture angle θ of lens 5 is made greater than θ', all of the light issuing from the second focal point 22 will theoretically be incident of the lens 5, thus contributing to very efficient utilization of illuminating light. Needless to say, increasing the entrance aperture angle θ of lens 5 or its numerical aperture NA(=sinθ) will lead to an increase in both the dimensions and cost of the lens 5; hence, one may reasonably design lens 5 whose entrance aperture angle θ is slightly smaller than the maximum radiant angle θ'.

Considering these facts, a maximum range for the entrance aperture angle θ of lens 5 may be expressed by:

$$0.8 \tan^{-1}(2m/m^2 - 1) \leq \theta \leq 1.2 \tan^{-1}(2m/m^2 - 1) \tag{9}$$

To give a typical example of numerical data, Ds=25 mm, Df=50 mm, Rm=37.5 mm and m=3 (see FIG. 2). Form eq. (8), θ' is calculated to be 36.9 degrees, so the entrance aperture angle θ of lens 5 may also be set at 36.9 degrees (NA=0.60). In FIG. 1, the case of θ=θ' is assumed.

The slide indicated by 6 in FIG. 2 is replaced by a liquid-crystal panel if the illuminating optics is to be used in a liquid-crystal projector. For use in practical applications, holes for air passage may be provided in the space between the spheroidal mirror 2 and the spherical mirror 3 and the illuminating apparatus under consideration may be air cooled with a fan so as to prevent the elevation in temperature.

EXAMPLE 3

Figure 3:
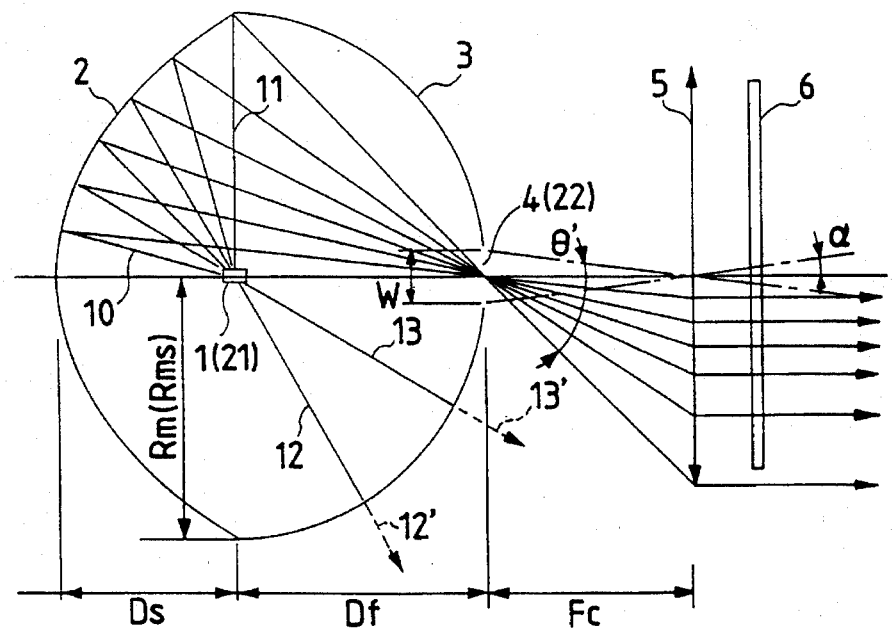
FIG. 3 is a sectional view showing a third embodiment of the present invention.

FIG. 3 shows an illuminating apparatus according to the third embodiment of the present invention. The basic composition of the apparatus is the same as those of the first and second embodiments and need not be described in detail.

If the open window 4 is a circular aperture with a diameter W and if the focal length of the condenser lens 5 is written as Fc, then the degree of parallelism α of illuminating light rays is expressed by:

$$\alpha = \tan^{-1}(W/2Fc) \tag{10}$$

In the case where illuminating optics is to be used in a projecting optical system such as a liquid-crystal projector or a slide projector, illuminating light beams of low parallelism (large α) will cause inconveniences such as the need to use a projection lens of larger aperture; hence, it is necessary to insure that the degree of parallelism of illuminating beams should not exceed about 6 degrees (α≦6°).

On the other hand, the light source 1 is not actually a point light source but has finite dimensions; hence, if the open window 4 is made unduly small, incoming light will be partly blocked by the edge of the window, thus lowering the efficiency of utilization of light. Therefore, it is not advisable to make the value of α unduly small but it should have the necessary and sufficient value to insure that the area of the aperture is maximized to increase the efficiency of utilization of illuminating light. Considering these facts, one may set the value of α within the range of from about 1 to 6 degrees and this helps producing illuminating optics that is satisfactory in terms of both the degree of parallelism and the efficiency of light utilization. In other words, the appropriate condition for the value of α may be expressed by:

$$1° \leq \tan^{-1}(W/2Fc) \leq 6° \tag{11}$$

Illuminating optics was constructed using the following numerical data as a typical example (see FIG. 3): Ds=35.4 mm; Rm=50 mm; Rms=50 mm (=Df); W=5.2 mm; and Fc=50 mm. The optics could achieve very efficient utilization of light with the degree of parallelism (α) being 3 degrees.

Figure 6:
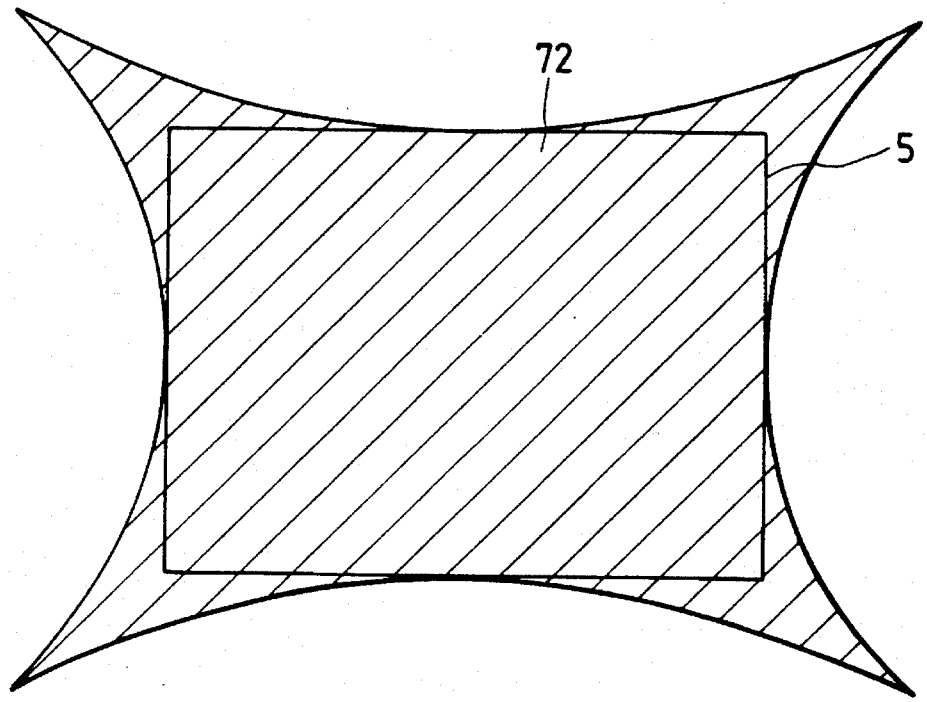
FIG. 6 is a perspective view illustrating the relationship between a rectangular object to be illuminated and the pattern of illumination with illuminating rays in to the case reviewed by the present inventors prior to the accomplishment of the present invention.

The slide indicated by 6 in FIG. 6 is replaced by a liquid-crystal panel if the illuminating optics is to be used in a liquid-crystal projector. For use in practical applications, holes for air passage may be provided in the space between the spheroidal mirror 2 and the spherical mirror 3 and the illuminating apparatus under consideration may be air cooled with a fan so as to prevent the elevation in temperature.

EXAMPLE 4

This example refers to an illuminating apparatus according to the fourth embodiment of the present invention, which is designed for illuminating a transmission-type liquid-crystal light value having a diagonal line 76.2 mm long and an aspect ratio of 3:4.

Shown by 1 in FIG. 4 is a light source which is a halogen lamp of the size 10 mm. The filament in the lamp is 4 mm long. This light source 1 is positioned at the first focal point of a spheroidal mirror 2 to be described just below.

The spheroidal mirror 2 is a mirror the surface of which is ellipsoidal as generated by the revolution of an ellipse having a minor axis of 37.4 mm and a major axis of 45.0 mm. This spheroidal mirror is capable of magnification by a factor of 3.5 and the distance between the first and the second focal points 21 and 22 is 50.0 mm.

We now describe the shape of the spheroidal mirror 2 (see FIG. 7). First, assume a plane 41 that is normal to the optical axis 8 and which is positioned 39.8 mm distant from the second focal point 22 of the mirror 2. Then, make the orthographic projection 51 of a rectangular object 5 on the plane 41; the object has a diagonal line 76.2 mm long and an aspect ratio of 3:4. Assume a quadrilateral pyramid whose base is defined by the rectangular cross section of the orthographic projection 51 and whose vertex is located at the second focal point 22 of the spheroidal mirror 2. Further assume four planes that are extensions of the four lateral sides of the quadrilateral pyramid. Cut the spheroidal mirror 2 by the lines of intersection of these four planes of extension and the side plane of the mirror.

Figure 8:
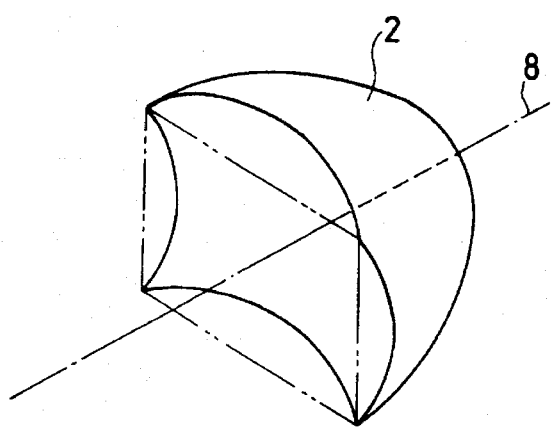
FIG. 8 is a perspective view showing the peripheral shape of the spheroidal mirror used in the system of the present invention.
Figure 9:
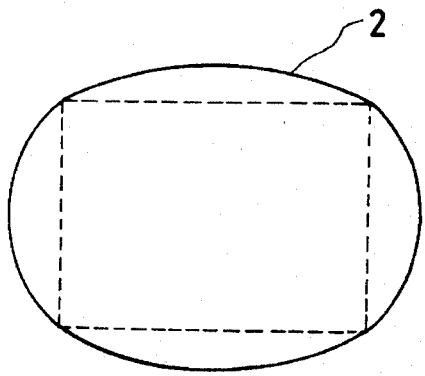
FIG. 9 is a diagram showing the shape of the spheroidal mirror in the system of the present invention as it is seen at infinity on the optical axis.
Figure 12:
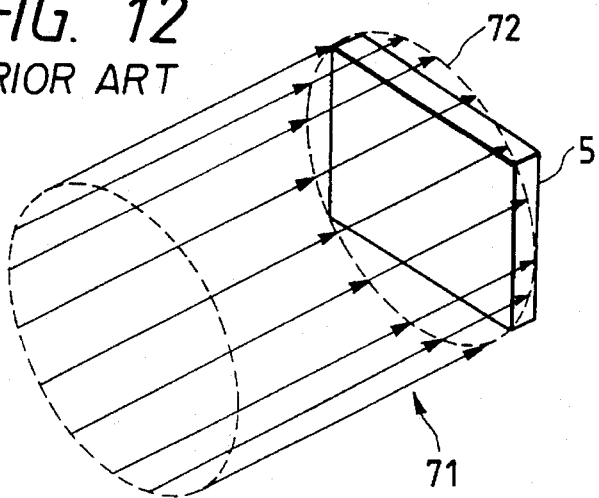
FIG. 12 is a perspective view showing the relationship between a rectangular object to be illuminated and the pattern of illumination with illuminating rays in the apparatus of FIG. 10.

The spheroidal mirror thus constructed has a peripheral shape as shown in FIG. 8. When it is seen at infinity on the optical axis 8, the peripheral shape of the spheroidal mirror 2 is a barrel-like distortion of the rectangle shown in FIG. 9 which has the same aspect ratio as the object 5 to be illuminated. The diagonal line of that shape is 71.9 mm long.

The spherical mirror 3 is a hemispherical mirror having a radius of 50 mm. The aperture 31 made in the central portion of this mirror is circular and its diameter, as calculated from the size of the filament in the light source 1, the magnification as achievable by the spheroidal mirror 2 and an appropriate factor, is 20 mm. The shape of the aperture 31 need not necessarily be circular but it may be rectangular.

The spheroidal mirror 2 is positioned in such a way that its first focal point coincides with the center of the spherical mirror 3. Since the magnification as achievable by the spheroidal mirror 2 is 3.5, it can be inserted in such a way that its missing portion 23 is located inward of the aperture in the spherical mirror 3. Hence, all of the light emitted from the light source 1, except the light that leaks directly through the aperture 31 in the spherical mirror 3, can eventually be collected at the second focal point of the spheroidal mirror 2.

The design and placement considerations of the condenser lens 4 are as follows. The condenser lens 4 is placed in the position where the imaginary quadrilateral pyramid described above is placed, or in the position where a cross section of the flux of divergent rays 63 has substantially the same dimensions as the object to be illuminated. In order to insure that the front focal plane of the condenser lens 4 coincides substantially with the second focal point of the spheroidal mirror 2, the condenser lens 4 is designed to have a focal length of 39.8 mm. Its aperture has a diameter of 80 mm which is slightly greater than the size of the object to be illuminated and its effective numerical aperture (NA) is 0.69 or more.

If the conditions set forth above are satisfied, the desired illuminating rays 71 are produced that are substantially parallel to each other and which have generally the same dimensions as the object 5 to be illuminated.

In Example 4, the object to be illuminated is a transmission-type liquid-crystal light valve that is disposed normal to the optical axis 8; it should, however, be noted that this is not the sole case of the present invention and the object to be illuminated may be a reflection-type liquid-crystal display device that is disposed at an angle to the optical axis 8.

According to the present invention, the greater part of the beams that are emitted from the light source forward (as exemplified by beams 12' and 13' shown in FIGS. 1, 2 and 3) which cannot be effectively used by the prior art illuminating apparatus can be utilized as illuminating light and this contributes to the fabrication of an illuminating apparatus that is very bright and which permits efficient utilization of light emitted from the light source.

The efficiency of utilization of light emitted from the light source can be further improved by insuring that both the magnification m as achievable by the spheroidal mirror and the radius of the spherical mirror are within the optimum ranges specified by the present invention.

A still further improvement can be achieved in the efficiency of utilization of light emitted from the light source by insuring that a maximum angle subtended by the rays issuing from the secondary light source (the image of light source formed near the second focal point of the spheroidal mirror) is substantially equal to the entrance aperture angle of the condenser lens.

If the relationship between the size of the open window 4 and the focal length of the condenser lens 5 is set to satisfy the condition specified herein, one can construct an illuminating apparatus that permits efficient utilization of light and which features high degree of parallelism in illumination light.

Another advantage of the illuminating apparatus of the present invention is that it permits as efficient utilization of emitted light as achievable by the system shown in Japanese Patent Laid-Open Publication (kokai) Hei-3-168629. Furthermore, the pattern of illumination 72 can be made substantially the same in both shape and size as the object to be illuminated and, therefore, one can produce illuminating rays 71 that permit very efficient illumination of the object. With the system shown in Japanese Patent Laid-Open Publication (kokai) Hei-3-168629, supra, the efficiency of illumination that can be achieved for the object having an aspect ratio of 3:4 has been no more than about 61%, in contrast, a value almost equal to 100% is achieved by the system of the present invention. Compared to the Reviewed Case, the system of the present invention has the advantage that the efficiency of illumination is improved with respect to that part of illuminating rays which illuminates areas outside the object 5 of interest.

What is claimed is:

1. An illuminating apparatus comprising:

a spheroidal mirror;

a light source positioned near a first focal point of said spheroidal mirror, said spheroidal mirror reflecting light from said light source and directing said light toward a second focal point of said spheroidal mirror, said first and second focal points defining an optical axis;

a spherical mirror having a center of curvature which substantially coincides with said first focal point and having a radius of curvature which is substantially equal to a distance between said first focal point and said second focal point, said spherical mirror having an aperture on said optical axis at said second focal point; and an object to be illuminated having a non-circular periphery in a plane perpendicular to the optical axis and a positive lens positioned between said spherical mirror and said object to receive diverging light rays passing through said aperture and project substantially collimated light rays toward the object to be illuminated;

wherein said spheroidal mirror has a peripheral shape such that it omits a mirror portion that would otherwise reflect light that does not illuminate the object, and such that light from the light source which is directed outside a periphery of the spheroidal mirror is reflected back to the spheroidal mirror by an adjacent portion of the spherical mirror which is positioned adjacent to the periphery of the spheroidal mirror as seen from said light source and is reflected by a part of the spheroidal mirror which faces the adjacent portion of the spherical mirror so that the positive lens projects substantially collimated light rays in a non-circular pattern, thereby illuminating the object.

2. An illuminating apparatus according to claim 1 wherein the periphery of said spheroidal mirror is determined by lines of intersection of four imaginary planes that are constructed by the following procedure:

forming a plane perpendicular to the optical axis at the position of a principal plane of said positive lens;

projecting a rectangular shape of the object to be illuminated onto said plane with parallel rays of light and determining the resulting orthographic projection;

forming a quadrilateral pyramid that has the orthographic projection as its base and has a vertex facing said base which is positioned at said second focal point of the spheroidal mirror; and extending the four lateral sides of said quadrilateral pyramid to construct the four imaginary planes.

3. An illuminating apparatus according to claim 2 wherein the following condition is satisfied:

$$2.3 \leq m \leq 5 \text{ and } 0.8 Df \leq Rms \leq 1.2 Df$$

where $Rms$ is the radius of said spherical mirror; $Df$ is the distance between the first and second focal points of said spheroidal mirror; $Ds$ is the distance between a vertex and the first focal point of said spheroidal mirror; and $m$ is a magnification expressed by $(Ds+Df)/Ds$.

4. An illuminating apparatus according to claim 2 wherein the following condition is satisfied:

$$0.8 \tan^{-1}(2m/m^2-1) \leq \theta \leq 1.2 \tan^{-1}(2m/m^2-1)$$

where $Df$ is the distance between the first and second focal points of said spheroidal mirror; $Ds$ is the distance between a vertex and the first focal point of said spheroidal mirror, $m$ is a magnification expressed by $(Ds+Df)/Ds$; and $\theta$ is an entrance aperture angle of said lens.

5. An illuminating apparatus according to claim 2 wherein the following condition is satisfied:

$$1° \leq \tan^{-1}(W/2Fc) \leq 6°$$

where $W$ is a size of said aperture and $Fc$ is a focal length of said positive lens.

6. An illuminating apparatus according to claim 1 wherein the following condition is satisfied:

$$2.3 \leq m \leq 5 \text{ and } 0.8 Df \leq Rms \leq 1.2 Df$$

where $Rms$ is the radius of said spherical mirror; $Df$ is the distance between the first and second focal points of said spheroidal mirror; $Ds$ is the distance between a vertex and the first focal point of said spheroidal mirror; and $m$ is a magnification expressed by $(Ds+Df)/Ds$.

7. An illuminating apparatus according to claim 1 wherein the following condition is satisfied:

$$0.8 \tan^{-1}(2m/m^2-1) \leq \theta \leq 1.2 \tan^{-1}(2m/m^2-1)$$

where $Df$ is the distance between the first and second focal points of said spheroidal mirror; $Ds$ is the distance between a vertex and the first focal point of said spheroidal mirror, $m$ is a magnification expressed by $(Ds+Df)/Ds$; and $\theta$ is an entrance aperture angle of said lens.

8. An illuminating apparatus according to claim 1 wherein the following condition is satisfied:

$$1° \leq \tan^{-1}(W/2Fc) \leq 6°$$

where $W$ is a size of said aperture and $Fc$ is a focal length of said positive lens.

* * * * *

UNITED STATES PATENT AND TRADEMARK OFFICE
CERTIFICATE OF CORRECTION

PATENT NO.   :   5,613,767
DATED        :   March 25, 1997
INVENTOR(S)  :   Kenjiro Hamanaka It is certified that error appears in the above-indentified patent and that said Letters Patent is hereby corrected as shown below:

Column 6, line 11, "for it definition" should read --as defined--.

Column 10, line 47, that portion of equation (3) reading "M²31 1)" should read --$(m^2 - 1)$--.

Signed and Sealed this

Twelfth Day of August, 1997

Attest:

BRUCE LEHMAN

*Attesting Officer*    *Commissioner of Patents and Trademarks*